United States Patent [19]

Herrington et al.

[11] Patent Number: 4,888,038

[45] Date of Patent: Dec. 19, 1989

[54] APPARATUS AND METHOD FOR TEMPERING GLASS SHEETS

[75] Inventors: Richard A. Herrington, Walbridge, Ohio; Jeffrey R. Flaugher, Carlton, Mich.; John W. Borer, Perrysburg, Ohio; Alan C. Woodward, Wigan; Geoffrey Greenhalgh, Orrell, both of England

[73] Assignees: Libbey-Owens-Ford Co., Toledo, Ohio; Pilkington plc, St. Helens, England

[21] Appl. No.: 155,259

[22] Filed: Feb. 12, 1988

[51] Int. Cl.$^4$ ............................................. C03B 27/04
[52] U.S. Cl. ........................................ 65/114; 65/104; 65/115; 65/349; 65/351
[58] Field of Search ................. 65/351, 349, 115, 114, 65/104

[56] References Cited

U.S. PATENT DOCUMENTS

| | | | |
|---|---|---|---|
| 2,140,282 | 12/1938 | Drake | 65/349 |
| 4,115,092 | 9/1978 | Neely, Jr. | 65/182.5 X |
| 4,314,836 | 2/1982 | Seymour | 65/351 X |
| 4,323,385 | 4/1982 | Gintert et al. | 65/351 |
| 4,400,194 | 8/1983 | Starr | 65/351 X |
| 4,773,926 | 9/1988 | LeTemps et al. | 65/114 |

Primary Examiner—Arthur Kellogg
Attorney, Agent, or Firm—Marshall & Melhorn

[57] ABSTRACT

A manufacturing line for tempering glass sheets includes a furnace, an oven, a bending station, and a chilling section positioned in order along a generally horizontally extending conveyor for the glass sheets. The oven extends between the furnace and the bending station to maintain the glass sheets at a predetermined temperature. The oven has sidewalls formed of a plurality of brushes and is selectively extensible along the path of travel of the glass sheets. The oven includes controlled heating devices. The chilling section includes a plurality of tubes positioned above and below the path of travel of the glass sheets and connected to a source of air under pressure. The tubes are arranged in rows generally perpendicular to the path of travel and columns generally parallel to the path of travel in order to cause the glass sheets to meet predetermined fragmentation specifications.

23 Claims, 4 Drawing Sheets

APPARATUS AND METHOD FOR TEMPERING GLASS SHEETS

BACKGROUND OF THE INVENTION

The present invention relates generally to the production of glass sheets and, more particularly, to an improved method of and apparatus for tempering glass sheets to specific standards in a mass production operation.

In many countries, there are official regulations specifying the manner of fragmentation of tempered glass sheets for use as windows of motor vehicles. Such regulations commonly require that the fractured glass sheet should not contain dangerously elongated particles. For example, British Standard BS 5282 basically prohibits the presence of particles longer than 60 mm in which the length is not less than four times the width. British Standard BS 5282 specifies that the number of particles included in any 50 mm×50 mm square traced on the glass sheet should be within a limited range and further specifies a maximum permissible area of each particle.

In the recent automobile industry history, there has been a trend to reduce the thickness of the glass of windows to thereby aid in the overall reduction of the gross weight of the vehicle. However, for glass sheets of 3.5 mm or less in thickness, it becomes difficult to temper the glass sheet so as to meet the official regulations for fragmentation, and the difficulty is further compounded when the glass sheet is of relatively large size particularly with respect to the exclusion of elongated particles (spline).

A recent European safety code, ECE R43, Category I, has set new standards for tempered glass. According to the specification, glass 3.5 mm and thinner falls into category I, with a thickness tolerance of plus or minus 0.2 mm. There are two critical requirements of the code for glass in this category. First, there is a fragmentation range of 40 particles minimum and 450 particles maximum in an area of 50 mm×50 mm. Second, elongation fragments (i.e. spline) can not exceed 75 mm in length. The advent of these more tightly controlled safety specifications for tempered glass has presented increased challenges to the glass manufacturer.

U.S. Pat. No. 4,662,926 discloses a method for toughening a glass sheet by heating it to a temperature above the strain point and then quenching the heated glass sheet by blowing a cooling medium against both sides of the glass sheet from two opposed sets of nozzles. The cooling medium is caused to impinge on each side of the glass sheet in a concentric circular pattern such that the glass sheet is more effectively quenched and consequently more highly toughened in a generally circular central region.

Another process that has been successful in producing bent, tempered sheets of glass, such as are commonly used in glazing closures for automobiles and the like, is the horizontal press bending technique. This technique generally includes heating pre-trimmed flat sheets of glass to their softening or bending temperatures by advancing them on a roll conveyor through a heating furnace, bending the heated sheets to a desired curvature or shape between a pair of complementary mold members and then tempering the same by chilling the bent sheets in a controlled manner to a temperature below the annealing range of glass.

SUMMARY OF THE INVENTION

It is an object of the present invention to provide an improved method and apparatus for the tempering of glass sheets, which may be used as an automotive window and may be 3.5 mm or less in thickness, the method and apparatus being capable of stably producing tempered glass sheets which will fully meet the official strength and fragmentation requirements.

The present invention provides a method and apparatus for tempering glass sheet whereby a glass sheet is supported in a horizontal plane and moved in a horizontal path through a heating furnace on a conveyor. As the glass sheet passes through the furnace, it is heated to a desired bending temperature therethrough. After emerging from the heating furnace, the heated glass sheet is transferred onto a second conveyor section.

The second conveyor section moves the glass sheet into an oven which maintains the temperature of the heated glass sheet until the sheet is ready to be shaped in a bending press to a predetermined contour. The heat is maintained within the oven through the use of a suitable heating means such as electrical resistance elements or gas burners, for example, thereby causing the glass sheet within the oven to maintain a sufficient temperature suitable for bending.

Upon emerging through an opening in the exit end of the oven, the heated glass sheet is moved into a bending station. The bending station contains mold members with complementary shaping surfaces conforming in curvature to the shape of the glass sheet when bent. The mold members are mounted for relative movement toward and away from each other whereby, through the relative movement, the glass sheet is shaped into the desired contour. The glass sheet is then exited from the bending station and transferred to a third conveyor section.

The third conveyor section moves the bent glass sheet through a tempering station containing a chilling means. The chilling means contains upper and lower blastheads disposed above and below the path of movement of the glass sheet. The blastheads direct opposed blasts of cooling fluid toward and against the opposite surfaces of the glass sheet in a predetermined pattern.

The cooling of the glass sheet in the predetermined pattern more effectively quenches and consequently strengthens the glass sheet. The more effective quench and subsequent strength improvement prevents the presence of impermissible elongated particles when the glass sheet is fractured and also lessens the difference between the maximum and minimum numbers of particles in different unit areas of the fractured glass sheet.

It is an object of the present invention to provide an improved method and apparatus for tempering glass sheet and at the same time provide glass sheet which will meet the requirements for fragmentation range and fragmentation elongation in the various safety codes for tempered glass.

BRIEF DESCRIPTION OF THE DRAWINGS

The above objects and advantages of the invention will become manifest to one skilled in the art from considering the following detailed description of an embodiment of the invention in light of the accompanying drawings in which.

DESCRIPTION OF THE PREFERRED EMBODIMENT

Figure 1:
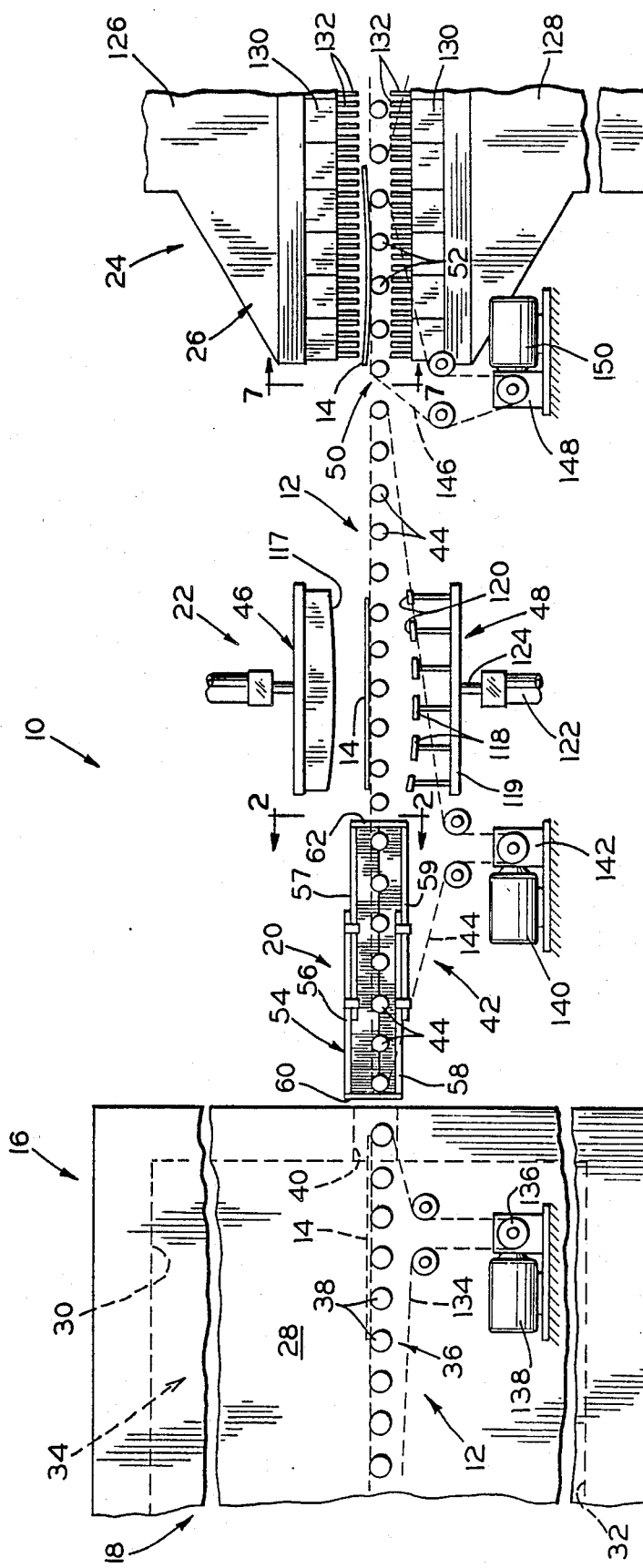
FIG. 1 is a diagrammatic front elevational view of a portion of a manufacturing line for tempering glass sheets embodying the novel features of the present invention.

Referring now in detail to the illustrative embodiment depicted in the accompanying drawings for carrying out this invention, there is shown diagrammatically in FIG. 1 a glass sheet tempering apparatus, comprehensively designated 10. The apparatus 10 includes a continuous conveyor system, generally designated 12, adapted to support a plurality of glass sheets 14 in a generally horizontal plane for movement along a continuous substantially horizontal path through a heating station 16 having a furnace 18 for heating the glass sheets 14 to their softening point or bending temperature.

The path continues through an oven section 20 having means for heating the glass sheets 14 after the sheets exit the furnace 18 in order to maintain their softening point or bending temperature. Next, a bending station 22 has means for bending the heated glass sheets 14 to the desired curvature, and a tempering station 24 has a chilling means 26 for rapidly reducing the temperature of the heated glass sheets 14 to produce the desired temper therein.

In the illustrative embodiment, the glass sheets 14 are heated in the furnace 18, which is of the tunnel-type having a pair of side walls 28, a top wall 30, and a bottom wall 32 defining a heating chamber 34. The heating chamber 34 can be heated in any desired manner by a suitable heating means, such as gas burners or electrical resistance elements, for example (not shown), located within the top and side walls of the furnace 18. Such heating means are suitably controlled by an apparatus (not shown) to obtain the desired temperature at various points in the heating chamber 34. The glass sheets 14 are carried through the heating chamber 34 on a first conveyor section 36, forming part of the conveyor system 12, and extending longitudinally through the furnace 18. The conveyor section 36 comprises a plurality of longitudinally spaced, transversely extending conveyor rolls 38 each journalled at its opposite ends in a pair of bearing blocks 39 (FIG. 2) located exteriorly of the furnace 18 and along the length of the conveyor section 36.

The plurality of glass sheets 14 are individually loaded on and supported in a generally horizontal plane on the longitudinally spaced conveyor rolls 38 at the entrance end of the furnace 18 and heated in a controlled manner to the desired temperature during their passage therethrough. Upon emerging through an opening 40 in the exit end of the furnace 18, the heated glass sheets 14 are transferred from the conveyor rolls 38 onto a second conveyor section 42, also a part of the conveying system 12. The section 42 is comprised of a series of spaced conveyor rolls 44, each journalled at its opposite ends in suitable bearing blocks 39 located along and on opposite sides of the oven section 20 and the bending station 22.

The series of rolls 44 support the glass sheets 14 horizontally for movement into and within the oven section 20, and into and within the bending station 22 between a pair of complementary press mold members 46 and 48. After bending, the sheets 14 are conveyed to the tempering station 24, whereat the bent glass sheets 14 are transferred from the conveyor rolls 44 onto a third conveyor section 50, also a part of the conveying system 12, and which is comprised of a series of spaced conveyor rolls 52, each journalled at its opposite ends in suitable bearing blocks 39 located along and on opposite sides of the tempering station 24.

The temperature of the glass sheets 14 immediately prior to the bending process step is the most critical factor in attaining the desired degree of uniformity of shape and temper in the glass sheets 14 processed in accordance with the present invention. For example, the sheets 14 must be heated to a temperature level rendering them pliable to impart the desired shape thereto when bending and to retain adequate heat for subsequent tempering.

While the optimum temperature range at which the glass sheets 14 should be processed can be maintained by the furnace 18, difficulty is encountered in consistently obtaining this optimum temperature range for a multiplicity of successively heated sheets. This is primarily due to the glass sheets 14 cooling down once they are exposed to the unheated environment outside the furnace 18 while waiting to be processed in the bending station 22.

The present invention contemplates maintaining the desired optimum glass temperature through the use of the oven section 20. The oven section 20, which extends transversely of the second conveyor section 42, receives heated glass sheets 14 from the furnace 18 and maintains the glass sheets 14 within a heated environment so as to minimize the loss of heat from the glass sheets 14. By using the oven section 20 in the present invention, the glass sheets 14 are maintained at an optimum temperature in order to attain the desired degree of uniformity of shape and temper.

Figure 2:
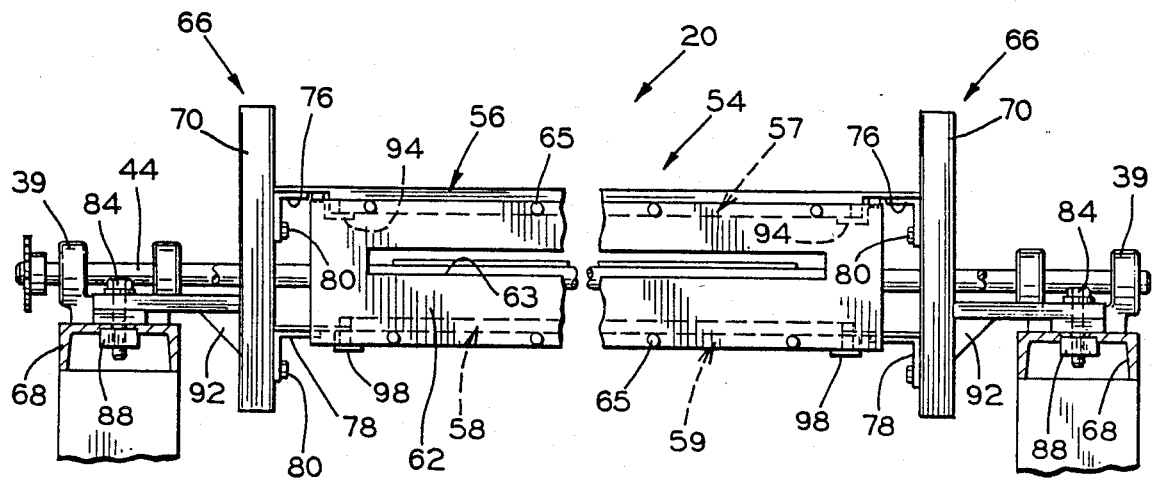
FIG. 2 is a fragmentary cross sectional view of an oven section taken along the line 2—2 in FIG. 1.
Figure 3:
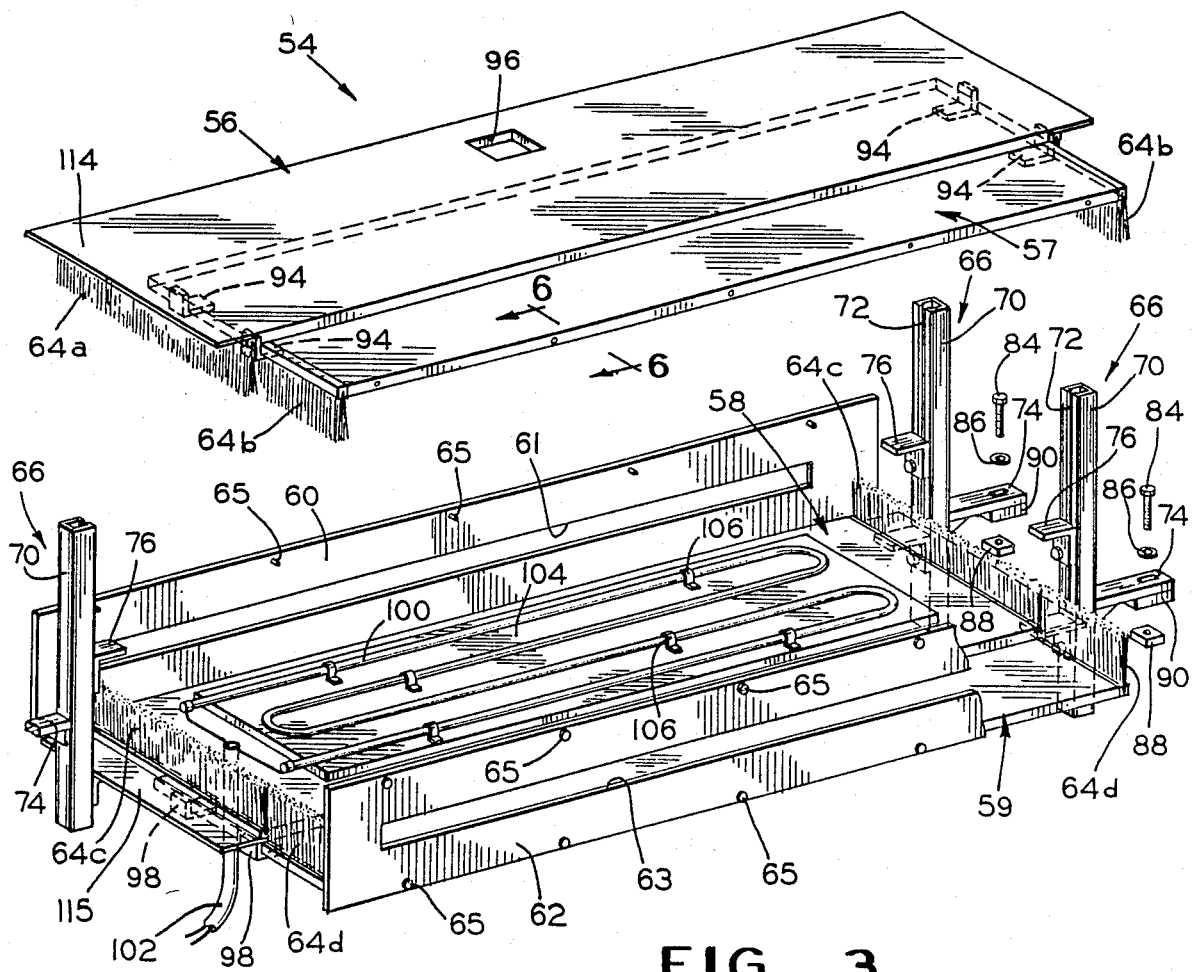
FIG. 3 is an exploded fragmentary perspective view of the oven section shown in FIG. 2.

As shown in FIGS. 1-6, the oven section 20 includes a heat chamber 54 defined by an upper and a lower wall, a pair of end panels through which the heated glass sheets 14 are passed, and a pair of side walls. As best shown in FIGS. 2 and 3, the upper wall is formed by a pair of panels, an upper panel 56 superposed over and slidably supporting a lower panel 57. Similarly, the lower wall is formed by a pair of panels, an upper panel 58 superposed over and slidably supporting a lower panel 59. The end of the heat chamber 54 closer to the furnace 18 is closed by an end panel 60 having a generally horizontally extending slot 61 formed therein for receiving the glass sheets 14. The end closer to the bending station 22 is closed by an end panel 62 having a generally horizontally extending slot 63 formed therein for exiting the glass sheets. Although the slots 61 and 63 can be utilized for substantially flat sheets of glass, the end panels 60 and 62 can be replaced by a pair of flexible, heat resistant curtains when glass sheets are preformed in the heat chamber on contoured rolls, for example, prior to final shaping at the bending station 22. The sidewalls are formed by a plurality of brushes which can be of any suitable heat resistant material such as nylon or stainless steel. For example, a downwardly extending brush 64a is attached to a side edge of the panel 56 and a downwardly extending brush 64b is attached to a side edge of the panel 57. An upwardly extending brush 64c is attached to a side edge of the panel 58 and an upwardly extending brush 64d is attached to a side edge of the panel 59. The brushes permit the conveyor rolls 44 to pass through the sides of the heat chamber 54 at any suitable location and tend to conform to the cross sectional shape of the conveyor rolls 44 to seal against the escape of heat from the heat chamber 54. The end panel 60 can be attached along an upper edge to an end edge of the upper panel 56 and along a lower edge to the upper panel 58 with a plurality of suitable threaded fasteners 65. Similarly, the panel 62 can be attached along an upper edge to an end edge of the lower panel 57 and attached along a lower edge to the lower panel 59 by threaded fasteners 65.

The heat chamber 54 is supported transversely of the conveyor section 42 by four support assemblies 66 attached to bearing block rails 68 located along and extending longitudinally on opposite sides of the conveyor system 12. Referring to FIGS. 2-5, each of the four support assemblies 66 is comprised of a vertically extending square tubular support arm 70 having a longitudinally extending slot 72 formed in a wall thereof facing the brushes. A horizontally extending arm 74 has one end attached to a corresponding one of the support arms 70 on an outwardly facing wall thereof opposite the wall configured with the slot 72. A pair of generally L-shaped brackets, an upper bracket 76 and a lower bracket 78, are each attached to the support arm 70 by means of a threaded fastener 80 and a nut 82. The nut 82 is located within the center of the support arm 70 and threadably engages an end of the fastener 80 which extends through an aperture in the corresponding one of the brackets 76 and 78 and through the slot 72. The horizontal arm 74 attaches to the bearing block rail 68 at the end opposite the support arm 70 by means of a threaded fastener 84 extending through a washer 86 and an elongated aperture formed in the arm 74. The fastener 84 further extends through an aperture formed in an upwardly facing surface of the rail 68 and engages a corresponding nut 88 positioned under the rail 68, and is spaced from the bearing block rail 68 by means of a spacer 90. A gusset 92 is attached to a lower surface of the horizontal arm 74 and to the support arm 70 in order to increase structural rigidity and to prevent a bending moment therebetween.

The upper panel 56 and the lower panel 57 forming the top of the heat chamber 54 are constructed so as to allow slidable movement of one panel with respect to the other panel. Typically, the panel 57 slides under the panel 56 which is fixed in place by force applied on the peripheral edge of the panel 56 by the L-shaped brackets 76. A pair of generally L-shaped brackets 94 extend downwardly and inwardly from each side edge of the panel 56 to support the panel 57. The panel 56 is further constructed with at least one square aperture 96, into which an electric eye (not shown) can be positioned to detect the leading and trailing edges of the glass sheets 14 in order to control the heating operation. In instances where a double line of glass sheets is being tempered, a pair of the apertures 96 can be formed in the panel 56 over the center lines of the two lines of glass sheets moving in parallel.

The upper panel 58 and the lower panel 59 forming the bottom of the heat chamber 54 are also constructed so as to allow slidable movement of one panel with respect to the other. Typically, the panel 59 slides under the panel 58 which is again fixed in place by force applied by the L-shaped brackets 78. A pair of generally L-shaped brackets 98 extend downwardly and inwardly from a lower surface adjacent a side edge of the panel 58 to support the panel 59. Panel 58 is further constructed with an electric resistance heating element 100, a Calrod heater for example, affixed to the upper major surface of the panel. The heating element 100 is controlled by, for example, an S.C.R. (Silicon Controlled Rectifier, not shown) which maintains it at a constant regulated temperature. The heating element 100 receives power through an electrical conductor 102 which extends through the panel 58 and is electrically connected to opposite ends of the heating element 100. Furthermore, the heating element 100 can be insulated from the panel 58 by a section of insulating material 104 positioned on an upwardly facing surface of the panel 58. The heating element 100 can be attached to the section 104 or the panel 58 by a plurality of clips 106.

Figure 6:
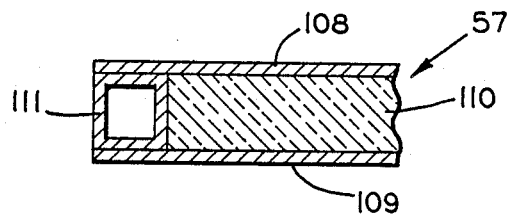
FIG. 6 is a cross sectional view of the oven section taken along the line 6—6 in FIG. 3.

The panels 56 through 59 are constructed as insulated panels to prevent as much heat loss from the heat chamber 54 as possible. As shown in FIG. 6, the panel 57 is comprised of an upper wall 108 and a lower wall 109 with an insulating material 110 sandwiched in between. The insulating material 110 can be any commercially available material suitable for the process such as Marinite ® or Fiberfax ®, for example. The upper wall 108 and the lower wall 109 are separated by square tubing 111 extending around the periphery of the panels, thereby leaving the walls 108 and 109 spaced apart in order to place the insulating material 110 therebetween.

Figure 4:
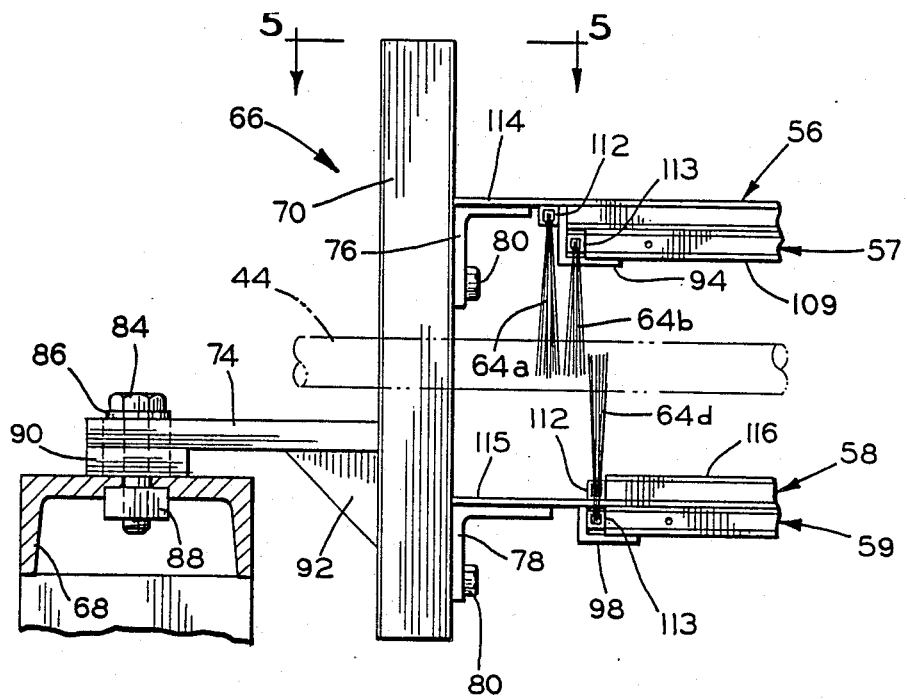
FIG. 4 is an enlarged fragmentary view of a mounting area of the oven section shown in FIG. 2.
Figure 5:
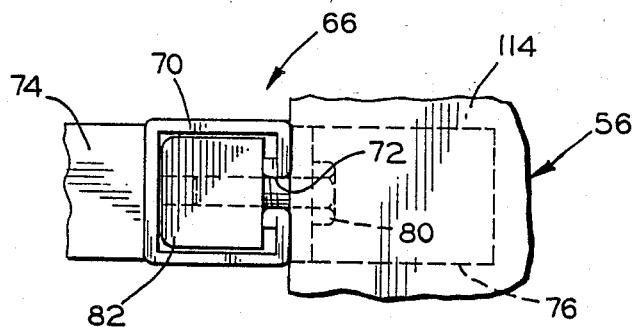
FIG. 5 is a cross sectional view of a mounting area of the oven section taken along the line 5—5 in FIG. 4.

As shown in FIG. 4, the brushes 64a through 64d are attached to the panels 56 through 59 respectively by a plurality of generally rectangular cross section tubular tracks 112 and 113. The tracks 112 and 113 extend along the side edges of the panels 56 and 57 respectively and each has a downwardly opening slot formed therein for receiving and retaining an edge of the brushes 64a and 64b respectively. The brush 64a extends the full length of the track 112. The brush 64b is cut to size to extend along only that portion of the track 113 which is exposed between the front end panel 62 and the facing edge of the panel 56. Similarly, the brush 64c extends the full length of its associated track 112 and the brush 64d is cut to length for its associated track 113.

In order to provide support for the upper and lower walls of the heat chamber 54, an upper wall 114 of the panel 56 and a lower wall 115 of the panel 58 are extended beyond the side edges of the panels. The extensions of the wall 114 rest upon an upwardly facing surface of the L-shaped brackets 76. Similarly, the extensions of the wall 115 rest on an upwardly facing surface of the bracket 78. The bolts 84 and nuts 88 can be loosened so as to adjust the support assemblies 66 inwardly toward the panels 56 and 58 so as to frictionally engage the side edges of the walls 114 and 115 thereby fixing the location of the panels 56 and 58 and the rear end panel 60 with respect to the bearing block rail 68. The panels 57 and 59 and the front end panel 62 are free to slide with respect to the fixed panels in order to adjust the length of the heat chamber to fit the available space between the heating station 16 and the bending station 22.

Furthermore, the downwardly facing wall 109 of the panel 57 and an upwardly facing wall 116 of the panel 58 as well as the corresponding surfaces of the panels 56 and 59 can be coated with a heat reflecting material to decrease the heat loss from the interior of the heat chamber 54 as well as reflect radiant heat back into the glass sheet 14.

The upper male mold member 46 and the lower female mold member 48 of the bending station 22 have opposed complemental shaping surfaces conforming in curvature to the shape of the sheets when bent and which are mounted for relative movement toward and away from each other. Referring again to FIG. 1, the male mold member 46 has a downwardly directed, generally convex shaping surface 117 and is mounted above the rolls 44 while the female mold member 48 is located below the conveyor rolls 44 and mounted for vertical movement toward and away from the male mold member 46. To permit displacement of the female mold member 48 above the level of the conveyor rolls 44 for lifting the glass sheets 14 thereabove, such member 48 is formed of a plurality of segments 118 mounted on a carriage 119 and spaced apart a sufficient distance to allow the segments 116 to pass between adjacent rolls 44. The segments 118 form a composite, ring-type structure having a generally concave shaping surface 120 complementary to the shaping surface 117 of the male mold member 46.

The carriage 119 is vertically movable by a fluid actuator 122 having a suitable piston rod 124 for raising and lowering the female mold member 48 between a lower position below conveyor rolls 44 and an upper position thereabove for lifting the heated glass sheet 14 from the conveyor rolls 44 and pressing the same against the male mold member 46 between the complemental shaping surfaces 114 and 120, thus forming the glass sheet 14 into the desired curvature. The male mold member 46 also can be mounted for vertical movement, if desired, by suspending the same from the piston rod of a fluid actuator. After bending is complete, the female mold member 48 is lowered and redeposits the sheet upon the conveyor rolls 44.

The chilling means 26 in the tempering station 24 includes upper and lower blastheads 126 and 128 disposed above and below the glass sheets 14 to direct opposed blasts of cooling fluid, such as air for example, toward and against the opposite surfaces of the glass sheets 14 moving along such path on the conveyor section 50. To this end, the blastheads 126 and 128 include plenum chambers or modules 130 having a plurality of tubes 132 projecting outwardly therefrom toward the path of movement of the bent sheets 14 to direct a plurality of streams of cooling fluid from a suitable supply source via modules 130 toward the opposite surfaces of the glass sheets 14.

Figure 7:
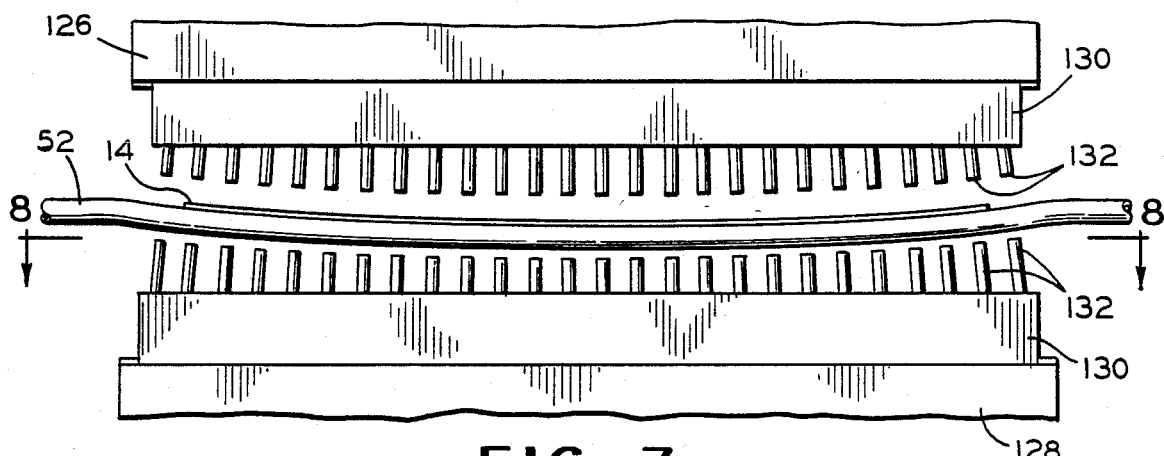
FIG. 7 is a cross sectional view of a chilling section taken along the line 7—7 in FIG. 1.
Figure 8:
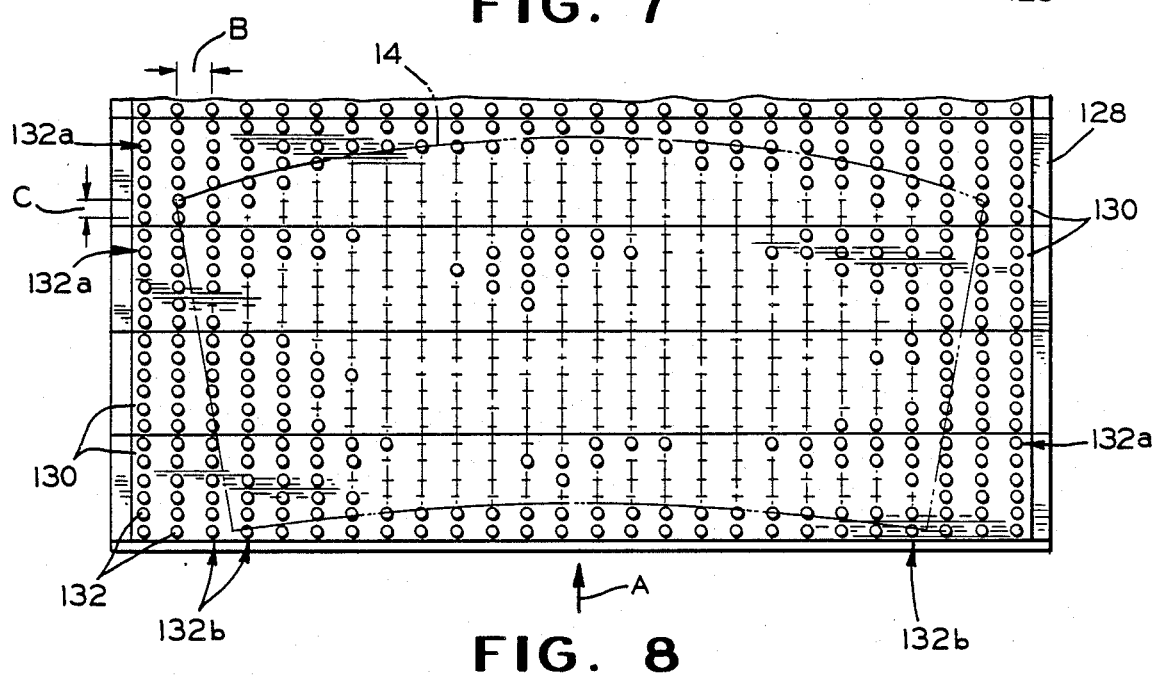
FIG. 8 is a fragmentary cross sectional view of the chilling section taken along the line 8—8 in FIG. 7.

As shown in FIGS. 1, 7 and 8, the plurality of tubes 132 extending from modules 130 in blastheads 126 and 128 are arranged in parallel rows 132a perpendicular to the path of travel of the glass sheets 14. The rows are spaced longitudinally of the path of travel and so arranged that each tube 132 of a row is in alignment with a tube of each adjacent row to form parallel columns 132b extending in the direction of the path of travel. As shown in FIG. 8, the longitudinal distance C between rows 132a is less than the transverse distance B between adjacent columns 132b. As best shown in FIG. 7, the tubes 132 on blasthead 126 are disposed substantially normal to the upper major surface of the sheet 14 and the tubes 132 on lower blasthead 128 are disposed substantially normal to the lower major surface of the sheet 14. It is preferred that the tubes of blastheads 126 are substantially in axial alignment with the tubes of 128. This configuration of a blasthead is known as a striped module blasthead, which aligns all the tubes 132 in the direction of travel, designated by an arrow A, of the glass sheet 14 on the rolls 52. The tube alignment of the striped module blasthead quenches the glass sheet 14 during the tempering process in such a manner that fragmentation range and elongation fragments are kept within specification limits.

Figure 9:
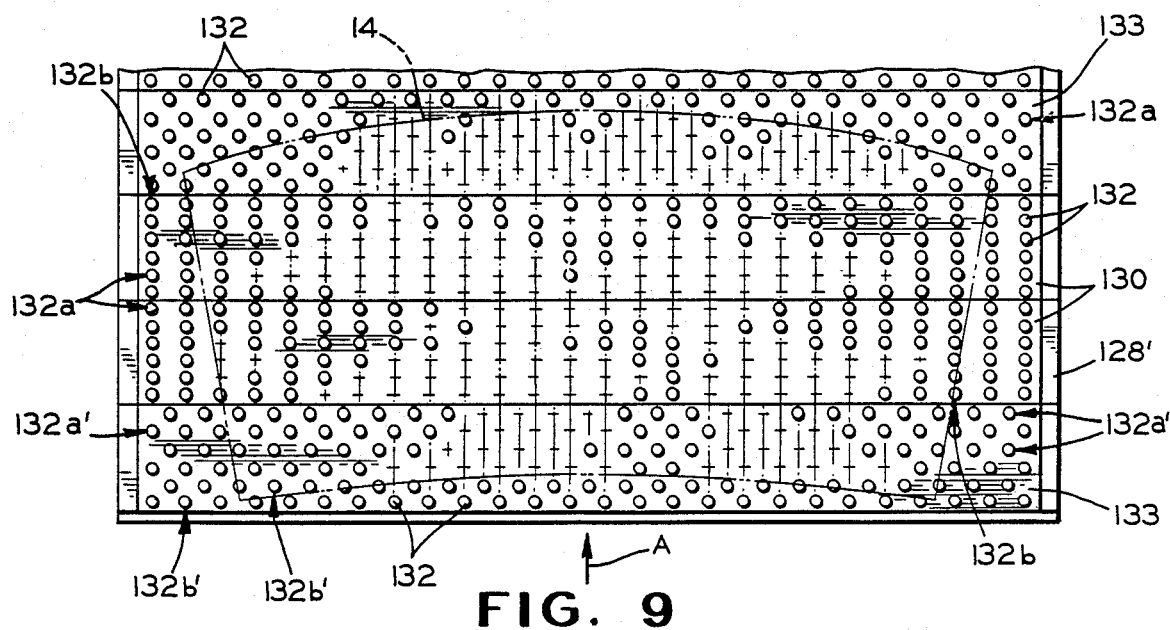
FIG. 9 is a view similar to FIG. 8 illustrating an alternate embodiment of the invention.

The exclusive use of striped modules in the blastheads as described, has been very effective at reducing the length of spline to acceptable lengths in very thin glass sheets. Unfortunately, it has also resulted in an increase in iridescence and occasionally an increase in particle size to a degree which can be unacceptable. Even though the resulting iridescence is acceptable, it is displeasing in appearance and should be avoided if possible. To this end, a modified form of a striped module blasthead 128' is shown in FIG. 9 wherein only a portion of the modules include the striped arrangement just described. The remaining modules, designated 133, of the blasthead include a more conventional tube arrangement, commonly known as the "domino five" design, wherein the tubes 132 of alternating rows 132a' are in alignment to form parallel columns 132b' extending in the direction of the path of travel. The design is dimensioned to provide alternating columns of tubes in alignment with columns of the striped modules. The remaining columns of tubes are positioned intermediate the striped columns to present a clustered tube arrangement that provides more even air distribution over the surface of the sheet. To provide the most satisfactory results, it was determined that the centermost module or modules should be of the striped construction while those at either end of the blasthead be of the conventional or "domino five" design. In this manner, the center portion of the glass sheet is exposed for the longest time to blasts from the striped modules at the critical initial portion of the quench when the entire sheet is in the confines, ie., the projected outline or periphery, of the blastheads while the leading and trailing edges are exposed to blasts of cooling fluid from the conventional modules 133. It should be understood that the glass sheet is continually moving through the chilling means at this time but at a reduced speed to that of the relatively high transfer speed required to minimize heat loss in the sheet 14 as it is moved from the bending station 22 to the tempering station 24. Thus, as the sheet 14 enters the chilling means 26 the opposite sides of the sheet are exposed to opposed blasts of cooling fluid in the pattern described for a time sufficient to produce the desired results, ie., improved fragmentation and reduced iridescence.

In the embodiments just described, the air pressure in the blastheads is in the range of 15-72 inches water column. This has proven satisfactory in most cases for producing tempered glass sheets 3.5 mm or less, which fully meet the official strength and fragmentation requirements. However, when tempering automotive glass that includes sharply curved end portions, such as wraparound backlights, the end portions retard the natural flow of air on the inboard or top surface of the glass sometimes resulting in unsatisfactory temper. This is especially true when tempering very thin glass sheets. This problem can be alleviated by applying compressed air, on the order of 3-110 psi, preferably 30-80 psi, to the inboard surface of the glass sheet. The compressed air may be applied across the full longitudinal length of the sheet or confined to the sharply curved end portions. This can be accomplished by connecting at least one row of the existing striping tubes to a source of compressed air and, if desired, closing off some of the tubes in the row to confine the air to the curved portions only. The same result can be achieved by inserting a compressed air tube with supply nozzles between two rows of the existing blasthead tubes. The number of nozzles is determined by need and should be in alignment with the tubes in the striping columns.

It should be understood that the rate of movement of the glass sheets 14 during each phase of the operation is controlled, by means of a motor controller (not shown), to be commensurate with the operation being performed on the glass sheet 14 during that phase. Thus, the speed of movement of the sheets 14 is varied along the conveyor system 12 as determined by the process being carried out so that the sheets can pass through the heating chamber 34 on the conveyor section 36 at a first speed, through the oven section 20 and bending station 22 on conveyor section 42 at a second rate of speed, and through the tempering station 24 at a third rate of speed. Accordingly, the glass sheets 14 are moved through the tempering apparatus 10 at predetermined rates of speed commensurate with the desired periods of time in which they are moved through and from one station to another.

As shown in FIG. 1, the conveyor rolls 38 of conveyor section 36 are driven in common, via an endless drive chain 134, from a suitable gear reduction mechanism 136 operably connected to a variable speed power source or electric motor 138. Rolls 44 of conveyor section 42 are driven in common from a variable speed motor 140 via a gear reduction means 142 and endless drive chain 144. Likewise, rolls 52 of conveyor section 50 are commonly driven by an endless chain 146 operatively connected, via gear reduction mechanism 148, to a variable speed motor 150. The variable speed electric motors 138, 140 and 150 are all operatively connected to a motor controller (not shown), so that any adjustments made to vary the speed of motor 138 and thereby the speed of conveyor section 36 for example, will effect corresponding adjustments in the rates of speeds of the other conveyor sections to maintain the respective rates of speed proportional. A typical speed is 1,400 to 3,000 inches per minute average through the stations. The faster the line speed, the less heat is required in the furnace 18 and the oven 20.

From the foregoing, it is apparent that the objects of the present invention have been fully accomplished. As a result of this invention, an improved method and apparatus is provided for tempering glass sheets in a manner maintaining the number of fragmentation particles and elongation fragments within a certain specified range. In accord with the invention, this is accomplished by controlling the heat exposure level of the glass sheets in a heating furnace, maintaining the desired level in an oven section and quenching the heated glass sheet in a striped blasthead quenching module.

In accordance with the provisions of the patent statutes, the present invention has been described in what is considered to represent its preferred embodiment. However, it should be noted that the invention can be practiced otherwise than as specifically illustrated and described without departing from its scope or spirit.

What is claimed is:

1. In an apparatus for tempering glass sheets including a chilling means for rapid cooling of a heated glass sheet and conveyor means for moving a heated glass sheet along a longitudinal path of travel through said chilling means, said chilling means comprising:

means for directing a cooling fluid against opposite sides of the heated glass sheet within said chilling means;

said directing means including first and second modules longitudinally spaced from one another, with each module extending transversely across the path of travel of the heated glass sheet, and with each module composed of a plurality of opposed tubes;

said first module having tubes arranged in a first predetermined pattern to provide a relatively uniform cooling pattern to a leading edge portion of the heated glass sheet as the sheet enters said chilling means, and to a trailing edge portion of the heated glass sheet after the sheet is located within said chilling means;

said second module having tubes arranged in a second predetermined pattern different from said first predetermined pattern to produce a predetermined longitudinally striped cooling pattern on at least a centermost portion of the heated glass sheet located within said chilling means;

a furnace for heating the glass sheet, and a bending station location between said furnace and said chilling means for shaping the heated glass sheet into a predetermined configuration prior to transferring the heated glass sheet to said chilling means, wherein said conveyor means moves the heated glass sheet from said furnace to said bending station, and through said chilling means;

a chamber means positioned along the conveyor means between said furnace and said bending means for maintaining a heated glass sheet located therein within a predetermined temperature range after the heated glass sheet is moved from said furnace into said chamber means; said chamber means including spaced-apart upper and lower walls, a front wall having an inlet for receiving the heated glass sheet, a rear wall having an outlet for discharging the heated glass sheet, and a pair of spaced apart side walls, said side walls being formed of a plurality of brushes extending vertically from at least one of said upper and lower walls.

2. An apparatus according to claim 1 including a third module extending transversely across the path of travel of the glass sheet and located on the side of said second module opposite said first module, said third module having tubes arranged in said first predetermined pattern to provide a relatively uniform cooling pattern to the leading edge portion of the heated glass sheet after the sheet is located within said chilling means.

3. An apparatus according to claim 1 wherein the tubes of said second module are arranged in a striped pattern which includes a plurality of parallel columns uniformly transversely spaced apart by a first predetermined distance, with each column being substantially parallel to the path of travel of the glass sheet, and each column including a plurality of tubes generally uniformly longitudinally spaced apart by a second predetermined distance less than said first predetermined distance.

4. An apparatus according to claim 2 wherein the tubes of said first module are arranged in a "domino five" pattern wherein each tube is substantially equidistant from four surrounding adjacent tubes.

5. An apparatus according to claim 4 wherein the "domino five" pattern of said first module defines a plurality of parallel columns uniformly spaced apart and parallel to the path of travel of the glass sheet, and wherein alternating columns of said plurality of parallel columns are spaced apart by said first predetermined distance and are in longitudinal alignment with said parallel columns of said second module.

6. An apparatus according to claim 4 including a third module extending transversely across the path of travel of the glass sheet and located on the side of said second module opposite said first module, said third module having tubes arranged in said first predetermined pattern to provide a relatively uniform cooling pattern to the leading edge portion of the heated glass sheet after the sheet is located within said chilling means.

7. An apparatus according to claim 1 wherein said chamber means defines an inlet for receiving the heated glass sheet and an outlet for discharging the heated glass sheet, and said chamber means includes means for adjusting the longitudinal spacing between said inlet and said outlet for setting the longitudinal length of said chamber means.

8. In an apparatus for tempering a glass sheet including a furnace for heating the glass sheet, a chilling means spaced from the furnace for rapid cooling of the glass sheet, and conveyor means for transporting the glass sheet along a longitudinal path between the furnace and the chilling means:
- a chamber means positioned along the conveyor means between the furnace and the chilling means for maintaining a heated glass sheet located therein within a predetermined temperature range after the heated glass sheet is removed from the furnace into said chamber means;
- said chamber means defining an inlet for receiving the heated glass sheet and an outlet for discharging the heated glass sheet;
- said chamber means including means for adjusting the longitudinal spacing between said inlet and said outlet for setting the length of said chamber means;
- said chamber means including spaced apart upper and lower walls, a front wall containing said inlet a rear wall containing said outlet and a pair of spaced apart side walls;
- said side walls being formed of a plurality of brushes extending vertically from at least one of said upper and lower walls.

9. An apparatus according to claim 8 including heating means contained in said chamber means for maintaining a predetermined temperature controlled environment in said chamber means.

10. An apparatus according to claim 8 including a bending station positioned between said chamber means and the chilling means for shaping the glass sheet into a predetermined configuration prior to transferring the sheet to said chilling means.

11. An apparatus according to claim 10 wherein the furnace and said bending station are spaced apart by a predetermined distance, and the length of said chamber means is adjustable to be substantially equal to said predetermined distance.

12. An apparatus according to claim 8 wherein said upper and lower walls are each formed of a pair of panels, one of said panels being a lower panel supported beneath an upper panel for slidable movement relative thereto.

13. In an apparatus for tempering a glass sheet including a furnace for heating the glass sheet, a chilling means spaced from the furnace for rapid cooling of the glass sheet, and conveyor means for transporting the glass sheet between the furnace and the chilling means:
- a chamber means positioned along the conveyor means between the furnace and the chilling means for maintaining a heated glass sheet located therein within a predetermined temperature range after the heated glass sheet is moved from the furnace into said chamber means;
- said chamber means including spaced apart upper and lower walls, a front wall having an inlet for receiving the heated glass sheet, a rear wall having an outlet for discharging the heated glass sheet, and a pair of spaced apart side walls; and
- said side walls being formed of a plurality of brushes extending vertically from at least one of said upper and lower walls.

14. An apparatus according to claim 13 wherein said brushes are formed form a nylon material.

15. An apparatus according to claim 13 wherein said brushes are formed from a stainless steel material.

16. An apparatus according to claim 15 wherein said brushes are releasably attached to said at least one of said upper and lower walls.

17. A method of tempering a relatively thin glass sheet so that it exhibits improved fragmentation and reduced iridescence characteristics, comprising the steps of conveying the sheet through a heating area and heating the sheet to a temperature adequate for tempering, continuously advancing the heated sheet along a path through a chilling area and directing opposed streams of cooling fluid against the opposite major surfaces of the advancing sheet sequentially in first, second and third patterns as it advances through said chilling area, each said pattern extending entirely across said chilling area, said streams of said first pattern being uniformly distributed and arranged in a plurality of spaced, longitudinal first columns aligned along the direction of travel of said sheet and spaced, transverse first rows, said streams in adjacent ones of said first longitudinal columns being staggered relative to one another, said streams in said second pattern being arranged in a plurality of spaced, longitudinal second columns aligned along the direction of travel of said sheet and spaced, transverse second rows, said streams in adjacent ones of said second longitudinal columns being aligned transversely relative to one another, with said second columns being longitudinally aligned with alternate ones of said first columns, and said streams in said third pattern being uniformly distributed and arranged in a plurality of spaced, longitudinal third columns aligned along the direction of travel of said sheet and spaced, transverse third rows, said streams in adjacent ones of said third columns being staggered relative to one another.

18. A method of tempering a relatively thin glass sheet as claimed in claim 17, wherein said first and third columns are longitudinally aligned.

19. A method of tempering a relatively thin glass sheet as claimed in claim 17, wherein said streams in said first and third patterns are arranged in a "domino five" pattern and said streams in said second pattern are arranged in a "striped" pattern.

20. Apparatus for tempering heated, relatively thin glass sheets by directing individual streams of cooling fluid against the opposite major surfaces of said heated sheets comprising, heating means for heating the sheets to a temperature adequate for tempering, chilling means for rapidly cooling the heated sheets, and conveyor means for supporting and continuously conveying said sheets one after another through said heating and chilling means, said chilling means including a blast head positioned to direct cooling fluid against each of the opposite surfaces of said sheets as they advance through said chilling means, each said blasthead including first, second and third modules arranged serially and having tubes through which said cooling fluid is directed against said surfaces entirely across said sheets as said sheets are continuously conveyed therepast, the tubes of said first module being uniformly distributed and arranged in a pattern of spaced, longitudinal first columns aligned with said conveyor means and spaced, transverse first rows, the tubes in adjacent ones of said first longitudinal columns being staggered relative to one another, the tubes of said second module being arranged in a pattern of spaced, second longitudinal columns aligned with said conveyor means and spaced, transverse second rows, said tubes in adjacent ones of said second longitudinal columns being aligned transversely relative to one another, with said second columns being longitudinally aligned with alternate ones of said first columns, and the tubes of said third module being uniformly distributed and arranged in a pattern of spaced, longitudinal third columns aligned with said conveyor means and spaced, transverse third rows, said tubes in adjacent ones of said third columns being staggered relative to one another, whereby said sheets following passage through said chilling means exhibit improved fragmentation and reduced iridescence characteristics.

21. Apparatus for tempering heated, relatively thin glass sheets as claimed in claim 20, wherein said first and third columns of tubes are in longitudinal alignment.

22. Apparatus for tempering heated, relatively thin glass sheets as claimed in claim 20, wherein said tubes of said first and third modules are disposed in a "domino five" pattern.

23. Apparatus for tempering heated, relatively thin glass sheets as claimed in claim 20, wherein the distance between adjacent ones of said second columns is greater than the distance between adjacent ones of said second rows.

* * * * *